(12) United States Patent
Murphy

(10) Patent No.: US 8,517,560 B2
(45) Date of Patent: Aug. 27, 2013

(54) PORTABLE MULTI-PURPOSE ILLUMINATION DEVICE

(76) Inventor: Timothy Michael Murphy, Gaithersburg, MD (US)

( * ) Notice: Subject to any disclaimer, the term of this patent is extended or adjusted under 35 U.S.C. 154(b) by 590 days.

(21) Appl. No.: 12/347,068

(22) Filed: Dec. 31, 2008

(65) Prior Publication Data

US 2009/0168412 A1 Jul. 2, 2009

Related U.S. Application Data

(60) Provisional application No. 61/018,665, filed on Jan. 2, 2008.

(51) Int. Cl.
*F21L 4/04* (2006.01)
*F21L 4/00* (2006.01)
*F21V 27/00* (2006.01)
*F21V 21/00* (2006.01)

(52) U.S. Cl.
USPC ........... 362/198; 362/189; 362/258; 362/387; 362/391; 362/407

(58) Field of Classification Search
USPC .................. 362/198, 189, 258, 387, 391, 407
See application file for complete search history.

(56) References Cited

U.S. PATENT DOCUMENTS

| | | | |
|---|---|---|---|
| 1,036,000 A | 8/1912 | Pease | |
| 3,345,506 A * | 10/1967 | Hautzenroeder | 362/387 |
| 5,003,450 A * | 3/1991 | Burton et al. | 362/387 |
| 5,154,483 A | 10/1992 | Zeller | |
| 5,217,300 A * | 6/1993 | Lwery | 362/387 |
| 5,337,226 A * | 8/1994 | Wang et al. | 362/198 |
| 5,369,556 A * | 11/1994 | Zeller | 431/344 |
| 5,660,460 A * | 8/1997 | McLeod, Jr. | 362/103 |
| 6,091,453 A | 7/2000 | Coan | |
| 6,257,745 B1 * | 7/2001 | Speth et al. | 362/488 |
| 6,840,643 B2 | 1/2005 | Clemmer, Jr. | |
| 7,390,105 B2 * | 6/2008 | Nelson et al. | 362/198 |
| 2003/0016532 A1 * | 1/2003 | Reed | 362/198 |
| 2005/0201085 A1 * | 9/2005 | Aikawa et al. | 362/198 |
| 2008/0192461 A1 * | 8/2008 | Chien | 362/183 |

* cited by examiner

*Primary Examiner* — David J Makiya
(74) *Attorney, Agent, or Firm* — James M Smedley, LLC; James Michael Smedley, Esq.

(57) ABSTRACT

A portable multi-purpose illumination device that wraps into a compact shape for storage and includes a holding and storage device; a positioning member that is extendable and that is connected to the holding and storage device and around which at least a portion of the positioning member is wrapped for storage; and a light source housed within the holding and storage device and powered by connection to a power source which is at least one of (a) a power supply electrically connected via the positioning member and (b) a detachable battery housed within the holding and storage means. The positioning member is manually deformable and may be attached to various structures. The holding and storage device additionally features a retainer for various lenses and mirrors. The illumination device may be used to view a target object obscured from direct view by an intervening object by positioning the mirror appropriately.

18 Claims, 6 Drawing Sheets

PORTABLE MULTI-PURPOSE ILLUMINATION DEVICE

CROSS-REFERENCE TO RELATED APPLICATION

This Application claims the benefit of the priority of Applicant's earlier filed U.S. Provisional Application No. 61/018,665 filed on Jan. 2, 2008, the contents of which are incorporated herein by reference.

BACKGROUND OF THE INVENTION

1. Field of the Invention

This invention relates to a portable multi-purpose illumination device, and more particularly to a light source that can be positioned for hands-free task lighting, magnified inspection, hand-held conventional flashlight use, or mirrored viewing of an otherwise obstructed object.

2. Background of the Related Art

Light sources have many applications and are in widespread use. One common example is the ordinary flashlight. The flashlight has many advantages and it is safe and easily used by almost any person including children. Common flashlights come in many sizes and some are small enough to fit into a pocket or the like. Even though flashlights are small, they produce good illumination. However, despite these advantages flashlights have certain disadvantages. One big disadvantage is that flashlights are not suited for use in many situations where the user needs to employ both hands. Two hands are frequently required in situations where additional light is necessary or desirable. For instance, changing an automobile tire usually requires the use of both hands. If this is done at night, when there is no other person to hold the flashlight, the person changing the tire must find some way to support and aim the flashlight. The same problem exists when performing work on an engine under the hood of a car.

Another disadvantage of conventional flashlights is that often light will not reach an area in a crowded location that requires illumination. For example, the engine compartment of a modern car is so filled with hoses, belts, and wires that they limit access to tools. At times, it is necessary to illuminate a work area within the engine compartment, but this may not be possible due to the limited space available, the size of the flashlight, and the hand holding it. Consequently, the flashlight must be held at a considerable distance from the work area and thus the light can be interrupted by hoses, belts, etc. so that the intended work area or space is inadequately illuminated.

There are other portable lights with specialized uses, such as book lights for reading, that do not require the use of a hand to hold it, but again these are not versatile. A book light may be excellent for its intended purpose, but it does not function well as a multi-purpose flashlight.

There are some types of specialized flashlights, such as those secured to a hat or a belt by a clip, which project and direct light in front of the user. This type of light can be worn while walking and allows the hands to be free to carry equipment. However, it is designed for a specialized use and is not versatile.

There are some limited alternatives to flashlights for specialized purposes. Such devices may include a book light that includes a base, a neck portion, and a light. These devices are typically used in situations where localized light is required for reading a book. Book lights are designed to hold the light source at a designated and generally limited distance from the book. Thus, book lights are not versatile and they produce a light that has a bright illumination at the center of an illuminated area, which fades to poor light towards a periphery of the illuminated area. Consequently, the uses for such lights are relatively limited.

There are specialized light needs that do not have satisfactory light sources. An example of this is the keyboard of a computer, particularly the keyboard of a laptop computer. Frequently, computers are used in low light situations and, while the user is able to view the screen, the user has difficulty seeing the computer keyboard and associated reading material next to the keyboard. There are portable light devices available to the computer user, but such devices are simple too bulky and are not generally used for tasks that are not associated with the computers.

All of the previously mentioned lights are practically useless in situations where an area that is to be worked on or within cannot be viewed directly by the person that is attempting to perform a task in the obscured area. An example of this situation is working on an automobile engine where the bolts or the like that are to be removed cannot be viewed by the person working on the engine. This type of situation requires more than just direct illumination that a flashlight or the like can supply. In this situation, it is necessary to provide the person with a view of the area that he or she cannot see directly. Consequently, in this situation, some type of reflecting means is necessary to reflect an image of the work area, as well as an illumination source to illuminate the area where the work is to be preformed. There is a definite need for a device that provides a user with the capability of reflecting an image as well as illuminating a work area or an obscured area that is not possible with prior art flashlights and the like.

There are lighting devices that use flexible necks. These devices have a light at the tip of a neck. On some of these devices, the neck wraps around a base power source for storage. U.S. Pat. No. 5,154,483 to Noel E. Zeller (1992) discloses a flashlight with a flexible extension stored in a peripheral groove of a power-housing base. Zeller's peripheral groove is not designed to store precise lengths of neck, however. In addition, a user of Zeller's light is forced to manipulate the neck and power-housing base to free the neck. The present invention overcomes this problem by allowing a user to select a precise length of neck without touching, manipulating, or even using a power-housing base. The present invention allows a user to select a short length of neck to illuminate a small area, such as a paperback novel, or a longer length of neck to illuminate a larger area, such as several pages of sheet music. By not storing the neck around the power-housing base, the present invention retains an adjustable length neck when it is attached to other devices, such as a USB port on a computer or a cigarette lighter power source in a car. In addition, Zeller's light is designed for specialized use and is not as versatile as the portable multi-purpose illumination device of the present invention.

U.S. Pat. No. 1,036,000 to William H. Pease (1912) and U.S. Pat. No. 6,091,453 to Steven Coan and Gerald T. Mroch (2000) disclose devices designed for inspection of an obstructed field of view. However, these devices use necks that are not flexible and storable to precisely adjustable lengths. The present invention overcomes these limitations. In addition, the devices of Pease, Coan and Mroch are designed for specialized use and are not as versatile as the portable multi-purpose illumination device of the present invention.

U.S. Pat. No. 1,036,000 to William H. Pease (1912) uses a mirror and lamp where the mirror can rotate in only one plane. U.S. Pat. No. 6,840,643 to Gordon W. Clemmer, Jr. (2002) makes use of a mirror with two joints, to rotate the mirror in two planes. These devices are not designed to permit the user to quickly replace the mirror with lenses, color filters, and the like, however. The portable multi-purpose illumination device of the present invention overcomes these limitations by using a single joint, i.e., a ball and socket assembly, that is less expensive to manufacture, and allows the user to quickly and easily change from a mirror to a lens or the like. The present invention is more flexible by using a rotating ring that can mount on either side of the light source and has a stronger securing means by the use of a groove and ring design. In addition, the devices of Pease and Clemmer are designed for specialized use and are not as versatile as the present invention.

It is an object of the present invention to provide a portable and multi-purpose illumination device that overcomes the limitations of prior art illumination devices, such as flashlights and the like. It is an additional object to provide an illumination device that allows a user to illuminate and view obstructed areas that would normally not be possible. It is a further object of the invention to provide an illumination device that is self-supporting and configured to allow a user to readily position a lens, mirror, and a source of light precisely at a location where it will be most useful without a need to find additional objects or items to support the light source. It is yet another object of the present invention to provide a portable and multi-purpose illumination device that wraps and collapses around itself for compact storage.

SUMMARY OF THE INVENTION

These and other objects are accomplished by the present invention which provides a portable multi-purpose illumination device that wraps into a compact shape for storage, comprising: a holding and storage means; a positioning member that is extendable and that is connected to the holding and storage means and around which at least a portion of the positioning member is wrapped for storage; and a light source housed within the holding and storage means and powered by connection to a power source which is at least one of (a) a power supply electrically connected via the positioning member and (b) a detachable battery housed within the holding and storage means.

The positioning member may have electrical conduction means and may be electrically connected to the light source. In one embodiment, the power supply is electrically connected to the light source and includes a power supply switch for controlling the light source. In another embodiment, the detachable battery is alternately or additionally electrically connected to the light source.

The holding and storage means may include a switch connected between the light source and the power source for controlling the light source, e.g., at least one light emitting diode. The portable multi-purpose illumination device may further comprise a holding clamp attached to the exterior of the power supply for securing the holding and storage means to the power supply; and securing means for securing the power supply to an external structure or surface. The portable multi-purpose illumination device may further comprise pivot means provided on the power supply to join the positioning member to the power supply so that the positioning member pivotally extends from the power supply.

The holding and storage means may be provided with rotating means to which one end of the positioning member is attached and around which the positioning member rotates to vary the extension thereof and for storage. The positioning member may be manually deformable to provide at least one of articulation and a holding configuration to an external structure or surface. The positioning member may be detachable from at least the power supply and is then provided with one of (a) a clip for reattachment to an external structure or surface and (b) an electrical connector suitable for connecting to alternate power sources.

In an advantageous embodiment, the holding and storage means may be a housing having an outer cylinder wall in which is defined a circumferential storage channel to which one end of the positioning member is attached, and around which the positioning member wraps to vary the extension thereof and for storage. The portable multi-purpose illumination device may then further comprise mounting means for mounting the light source within the housing; a rear cover covering one side of the housing; and at least one rotating ring which is detachably mounted on the outer cylinder wall of the housing through which light emitted from the light source exits the holding and storage means. The device may then further comprise a connecting arm extending from the rotating ring and terminating in a female socket joint of a ball and socket assembly for detachable mounting of a detachable mounting means thereto. The detachable mounting means may be a retainer for one of a mirror, a lens, a diffuser, or a color filter, and the retainer may include a male ball member of the ball and socket assembly for detachable connection of the male ball member to the female socket joint. The male ball member and the female socket joint cooperate to articulate as a ball and socket assembly when engaged. The retainer advantageously retains a mirror.

These and other objects are further accomplished by the present invention which provides a method of viewing a target object obscured from direct view of a user by an intervening object; the method comprising: (a) providing the portable multi-purpose illumination device according to claim 16; and (b) positioning the mirror of the portable multi-purpose illumination device so that the user can view the target object despite the presence of the intervening object.

BRIEF DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE INVENTION

In the following detailed description of the invention, reference is made to the accompanying drawings, which form a part hereof and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
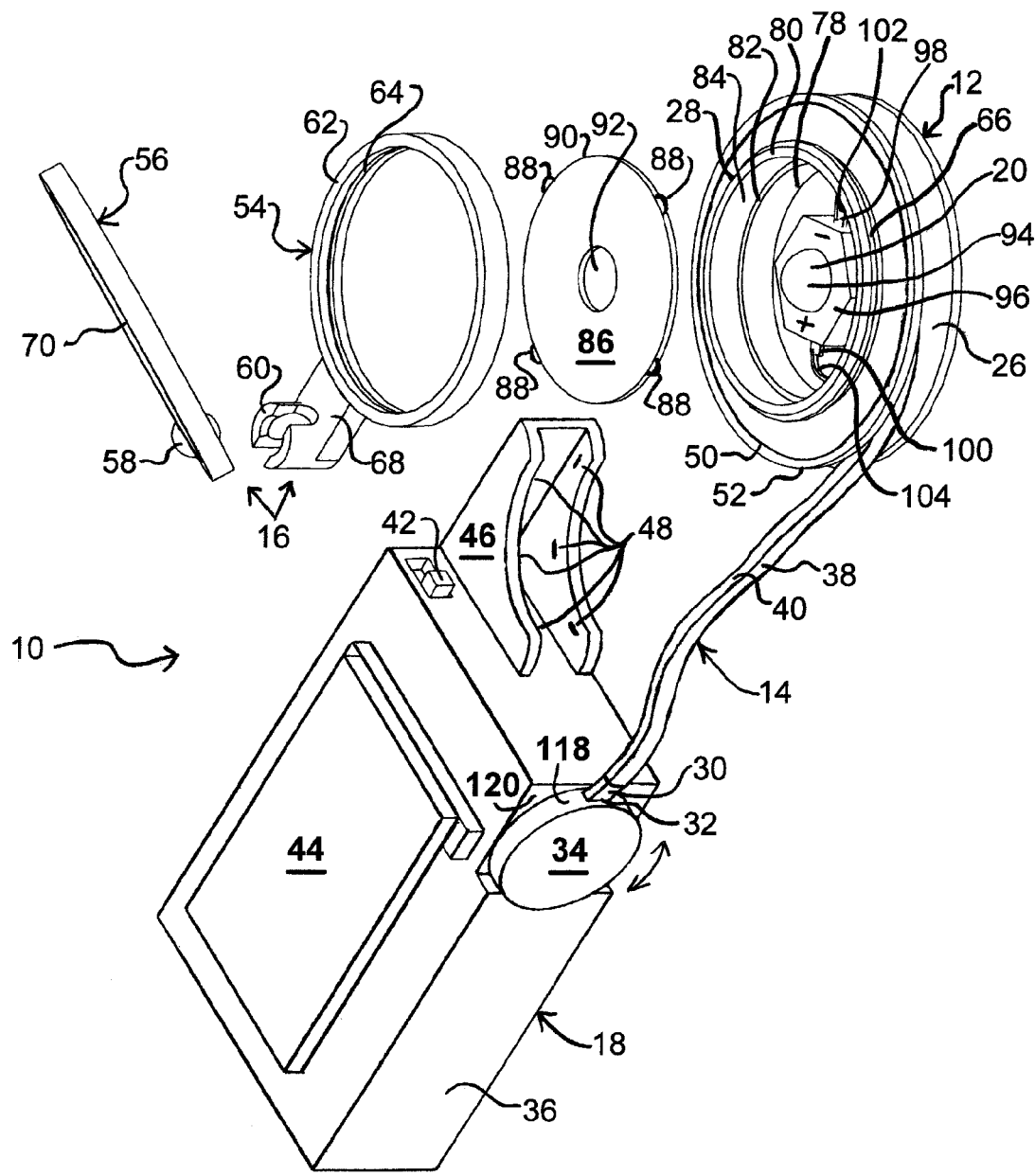
FIG. 1 is a perspective right-side exploded view of the portable multi-purpose illumination device.
Figure 2:
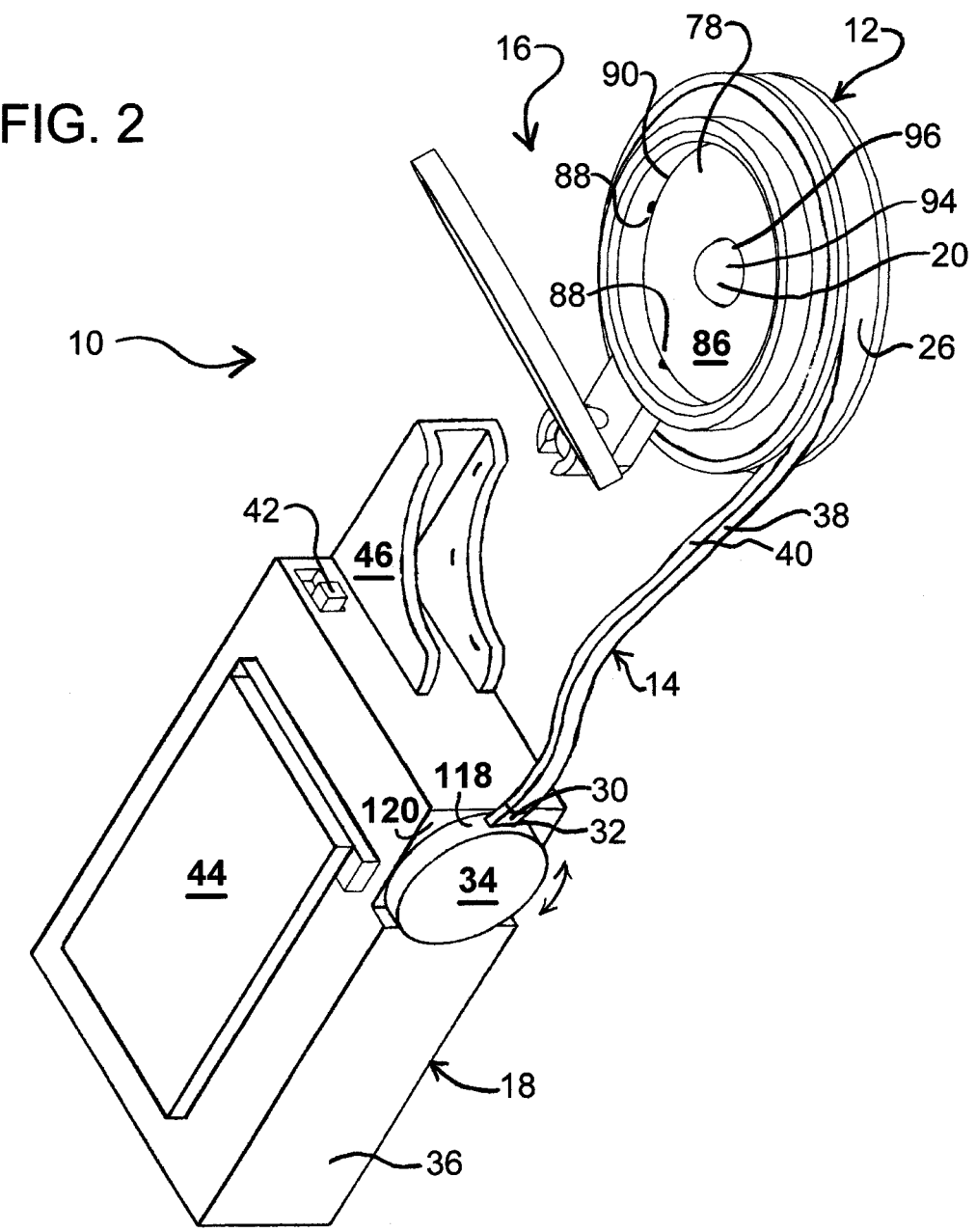
FIG. 2 is a perspective right-side view showing elements from FIG. 1 in an assembled view.
Figure 3:
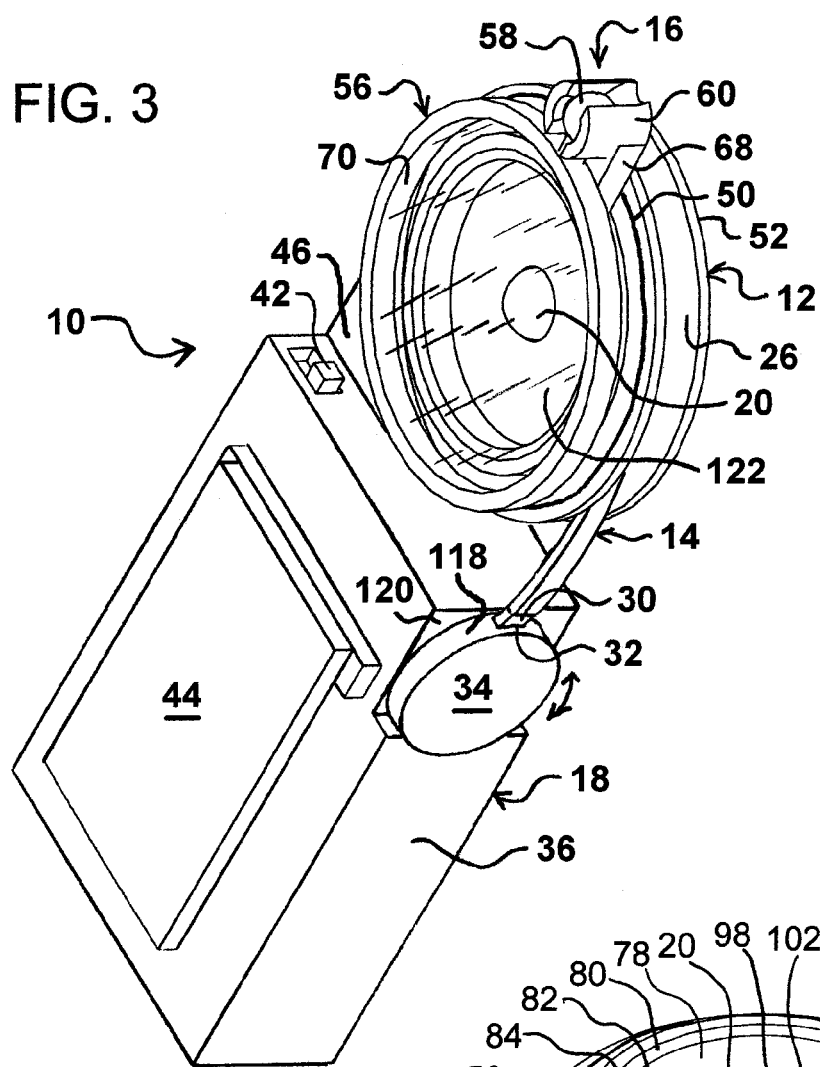
FIG. 3 is a perspective right-side view of the portable multi-purpose illumination device showing the elements in a stored position.

Referring first to FIGS. 1, 2, and 3 a portable multi-purpose illumination device 10 is illustrated and is designated generally by the number 10. The portable multi-purpose illumination device 10 comprises a holding and storage means 12 that is generally spool shaped, a positioning member 14 that is extendable and manually deformable, a ball and socket assembly 16, and a power supply 18 that is detachable. The holding and storage means 12 supports a light source 20 in a manner that will be hereinafter described in detail.

Figure 4:
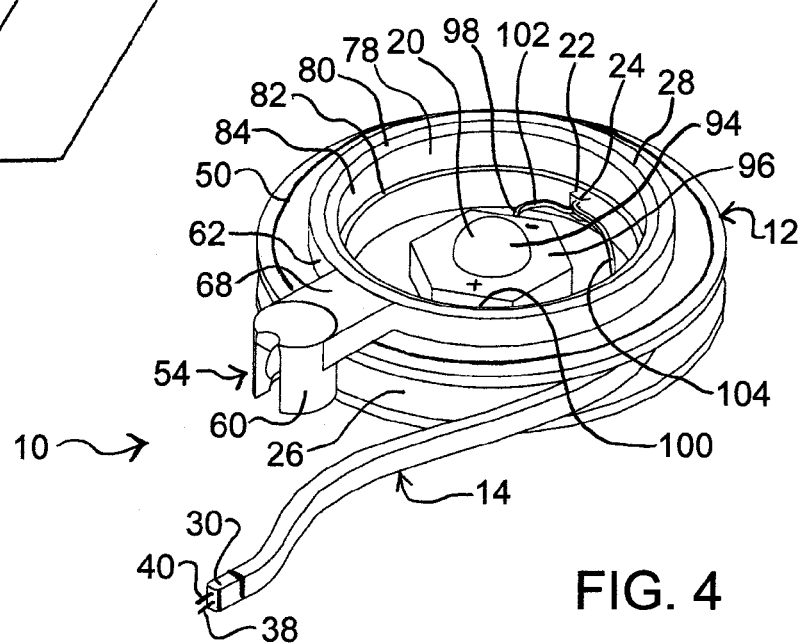
FIG. 4 is a perspective view of a female socket joint protruding over a circumferential storage channel of storage and holding means.
Figure 5:
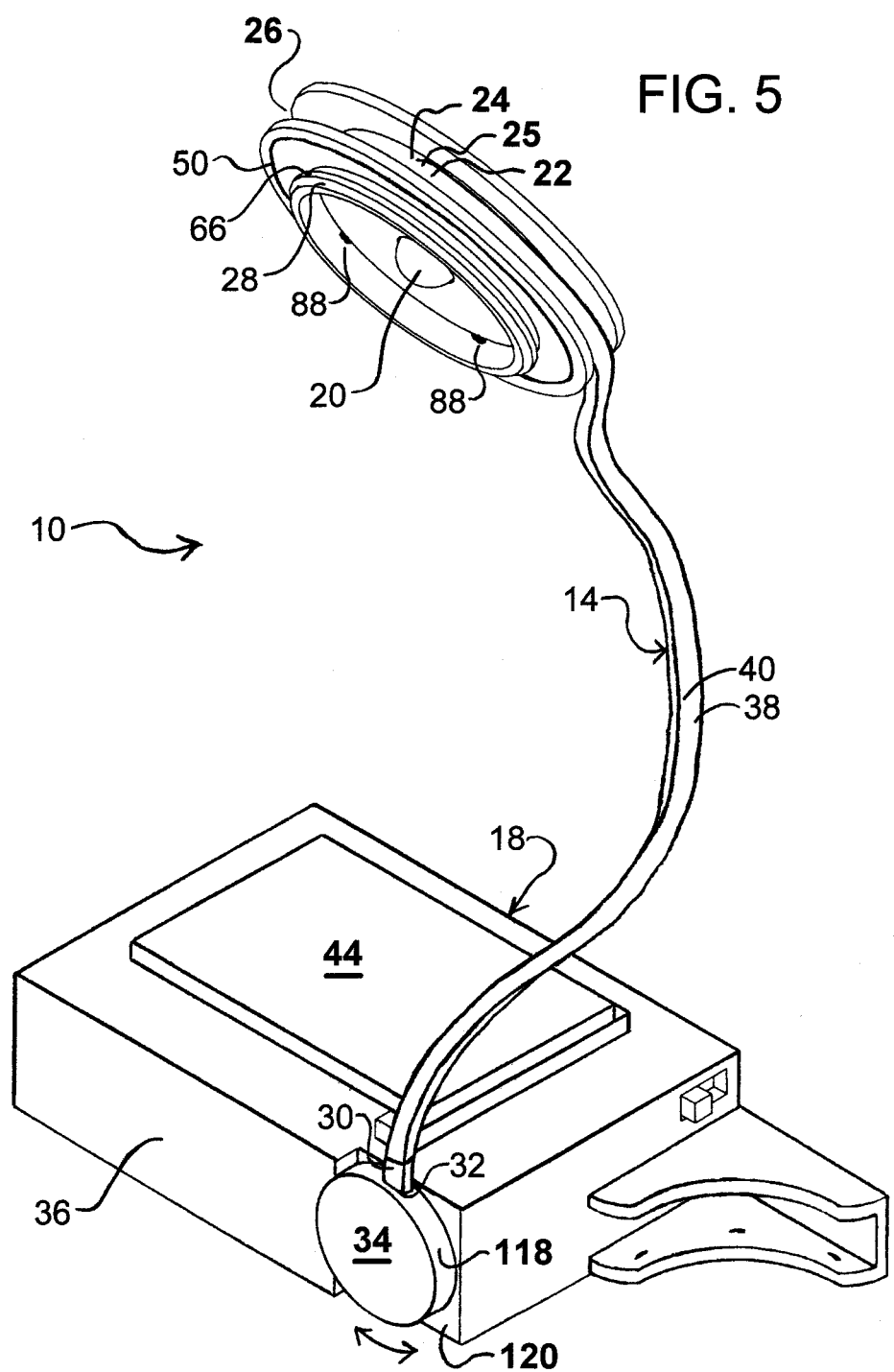
FIG. 5 is a perspective view illustrating a power supply resting on a horizontal plane with a pivot joint rotated and a positioning member extended from a stored position.
Figure 7:
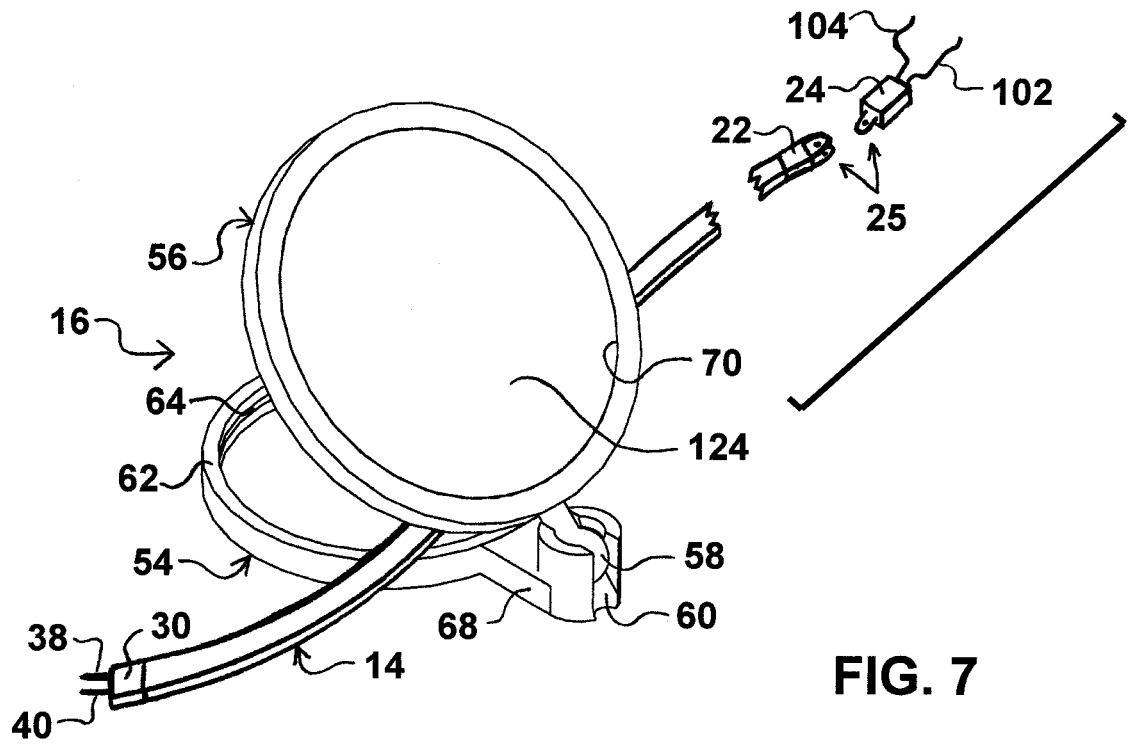
FIG. 7 is a perspective view of an annuli ball and socket in the process of closing in a clam like manor to secure itself to a positioning member. A holding and storage means is removed for clarity.

As illustrated in FIG. 7 the positioning member 14 contains a negative electrical conductor 38 and a positive electrical conductor 40 for transmitting electrical power from a suitable power source. FIGS. 4, 5, and 7 illustrate a connector 22 attached to one end of the positioning member 14 and connecting to a connector 24 located in a circumferential storage channel 26 and protruding through a housing 28 (having an outer cylinder wall) and into a cavity 78 of the holding and storage means 12. The connectors 22 and 24 are electrically and mechanically compatible and have a rotational means 25. As illustrated in FIGS. 1, 5 and 7 an electrical connector 30 attached to the other end of the positioning member 14 is connected through an opening in an exterior cylinder surface 118 of a pivot means 34 to an electrical connector 32 located inside the exterior cylinder surface 118 of the pivot means 34. The pivot means 34 is located in an exterior surface 120 of the power supply 18 that houses a battery 36 for supplying electrical power to the light source 20. A power supply switch 42 located on the power supply 18 permits a user to control the light source 20 in a conventional manner.

As illustrated in FIGS. 3 and 5 securing means 44 (spring activated and magnetized clip) is attached to the power supply 18. This allows a user to secure the power supply 18 to numerous types of surfaces both during use and for storage purposes.

Figure 8:
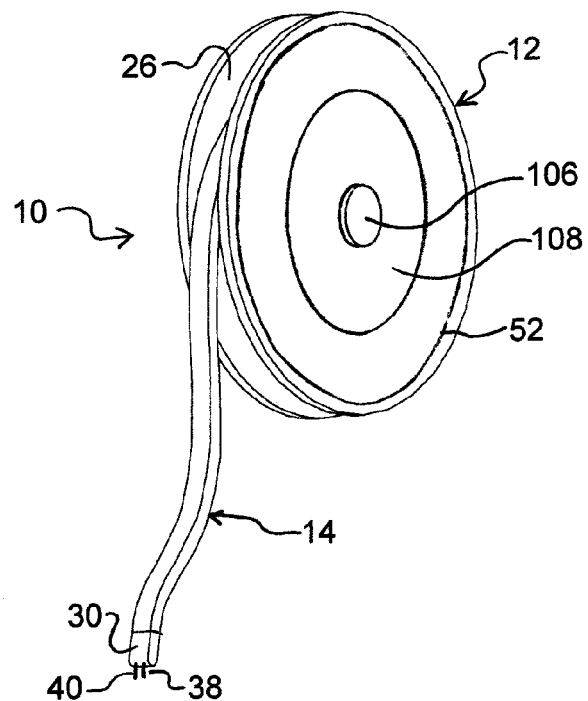
FIG. 8 is a perspective view of the portable multi-purpose illumination device showing a switch and a rear plate.

As illustrated in FIGS. 1, 3, and 8 a holding clamp 46 with arc spaced securing tabs 48 is attached to the exterior of the power supply 18 for securing the holding and storage means 12. The securing tabs 48 are located in both interior parallel walls of the holding clamp 46. A front circumferential groove 50 (best viewed in FIG. 1) and a back circumferential grove 52 (shown in FIG. 8) are located symmetrically on both external planes of the circumferential storage channel 26 of the holding and storage means 12. This compatible configuration allows a user to snap the holding and storage means 12 to the holding clamp 46 for securing the holding and storage means 12 to the power supply 18. FIG. 3 illustrates the holding clamp 46 securing the holding and storage means 12.

As illustrated in FIGS. 3 and 5 the pivot means 34 rotates to reduce stress on the positioning member 14 and to increase a range of motion of the holding and storage means 12. FIG. 3 shows position of the pivot means 34 when the holding and storage means 12 is in a stored position. FIG. 5 shows the pivot means 34 rotated in a different position that is suitable for task lighting and such.

As illustrated in FIG. 1 the ball and socket assembly 16 makes use of two components: (1) a combined rotating ring, connecting arm, and female socket joint 54 and (2) a combined retainer and male ball member 56. These two components (54 and 56) attach to each other by joining a male ball member 58 to a female socket joint 60 to form the ball and socket assembly 16.

As illustrated in FIGS. 1 and 2, a rotating ring 62 of the combined rotating ring, connecting arm, and female socket joint 54 has an interior circumferential groove 64 located symmetrically on its interior wall. An exterior retaining ring 66 is located on exterior wall of the housing 28 (having an outer cylinder wall) of the holding and storage means 12. The retaining ring 66 is compatible with the rotating ring 62. This allows a user to attach or remove in a snap-like fashion the rotating ring 62 to or from the holding and storage means 12. The interior circumferential grove 64 and the retaining ring 66 along with an inwardly biasing force of the rotating ring 62 helps secure the rotating ring 62 to the holding and storage means 12. This configuration allows a user to rotate the combined rotating ring, connecting arm, and female socket joint 54 to any position around the retaining ring 66 of the holding and storage means 12 while maintaining firm contact and attachment.

As illustrated in FIGS. 1 and 4 a connecting arm 68 has two parallel planes that are parallel to the two parallel planes of the rotating ring 62, and located between the female socket joint 60, and the rotating ring 62. The connecting arm 68 holds the female socket joint 60 at a radius greater than the outside radius of the circumferential storage channel 26. This allows a user to secure either plane of the rotating ring 62 to the holding and storage means 12. FIGS. 1 and 2 illustrates the combined rotating ring, connecting arm, and female socket joint 54 oriented with the female socket joint 60 protruding away from the circumferential storage channel 26. FIG. 4 illustrates the combined rotating ring, connecting arm, and female socket joint 54 oriented with the female socket joint 60 protruding over the circumferential storage channel 26. In this position, a user can further secure the positioning member 14 at a desired length. Note, the combined retainer and male ball member 56 is not shown in FIG. 4 because it is not needed, and so it can, and has been, removed from the combined rotating ring, connecting arm, and female socket joint 54.

Figure 6:
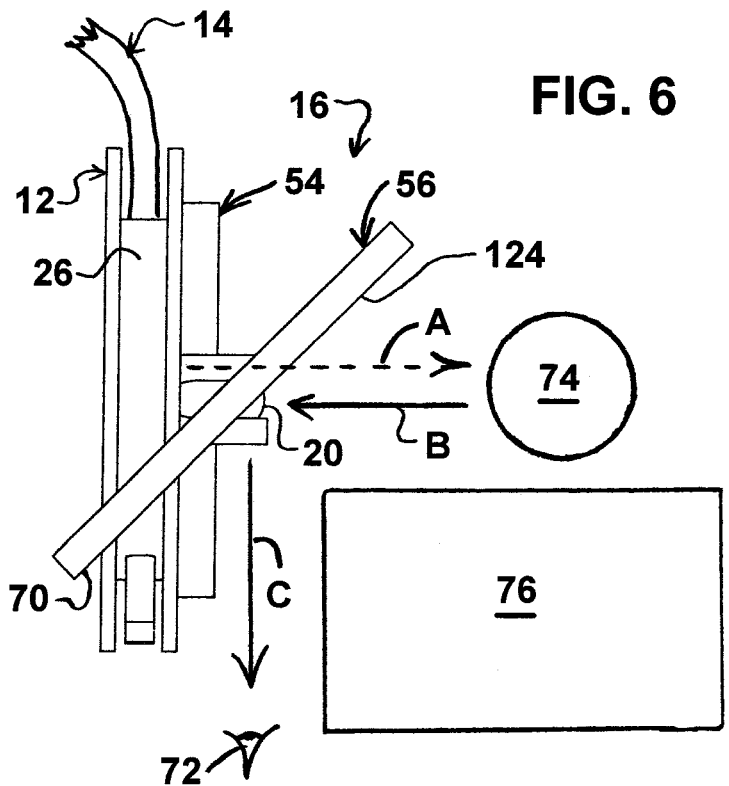
FIG. 6 is an orthogonal view illustrating mirrored viewing of an otherwise obstructed object. Two objects are added for demonstration purposes.

The combined retainer and male ball member 56 can rotate from a closed position shown in FIG. 3, to a semi-open position shown in FIG. 2, to a fully open or 235 degrees relative to the combined rotating ring, connecting arm, and female socket joint 54. When the combined retainer and male ball member 56 is generally open 90 degrees or larger relative to the combined rotating ring, connecting arm, and female socket joint 54, it can rotate completely around the male ball member 58 axes within the female socket joint 60. FIG. 6 shows an orthogonal view of the combined retainer and male ball member 56 rotated around its axes.

To summarize previously described positions the ball and socket assembly 16 attached to the holding and storage means 12 allows a user to position the combined retainer and male ball member 56 and the combined rotating ring, connecting arm, and female socket joint 54 in a variety of useful positions that will hereinafter be described in detail.

The ball and socket assembly 16 is easily removed from the holding and storage means 12 and used independently or attached in a clam-like manner to the positioning member 14 as illustrated in FIG. 7. This demonstrates how the ball and socket assembly 16 can function independently or in conjunction with the portable multi-purpose illumination device 10.

FIG. 5 illustrates the illumination device 10 when used as a book or a task light. In this illustration, the ball and socket assembly 16 is removed from the holding and storage means 12 to simplify usage. Because the area illuminated increases proportional to the distance of the light source, companies manufacture different lengths of gooseneck to accommodate the need of their customers. Typically, a six-inch, twelve-inch, or eighteen-inch length of gooseneck is used for a light fixture. The illumination device 10 is more compact and does not require different lengths of goosenecks to be manufactured. For example, if a user requires only a small area to illuminate, such as a paperback book, only a small amount of the positioning member 14 needs to be unwound. If however, a user prefers to illuminate a larger area, such as three pages of sheet music, a longer length of the positioning member 14 can be unwound.

Although not illustrated, it should be obvious that by wrapping the positioning member 14 around an object, such as a pluming-pipe, the illumination device 10 can function similar to a conventional snake light.

Illustrated in FIGS. 1, 3, 6 and 7 is a retainer 70 (with detachable mounting means for a mirror, a lens, a diffuser, or a color filter) that is part of the combined retainer and male ball member 56. The retainer 70 holds various known-in-the-art lenses and the like that are constructed of various materials and shapes to add uniqueness and versatility to the portable multi-purpose illumination device 10. The retainer 70 shows anyone skilled in the art where to attach, with known in the art methods, a lens, film etc. The combined retainer and male ball member 56 can be manufactured as a single element with known in the art injection molding, or it can be manufactured in parts (the male ball member 58 and the retainer 70 for example) and then assembled. Various materials and shapes can be constructed and mounted at the retainer 70 location to add uniqueness and versatility to the illumination device 10. For example, a frosted dome lens can be used to create a pleasant esthetic appearance. Various lenses or light transmitting and refracting means can be used to focus, color and/or diffuse the light source 20. If the light source 20 emits light in a lambertian pattern, and a lens 122 such as a collimator type or the like is used in the retainer 70, the light is focused and the illumination device 10 can be used in a similar manner as a conventional flashlight. FIG. 3 illustrates position of the lens 122 secured by the retainer 70 when the illumination device 10 is used like a flashlight. A magnifying lens (not shown) secured to the retainer 70 and rotated approximately 180 degrees from the rotating ring 62 is used to examine small objects. The light source 20 illuminates the subject to aid in this examination. A mirror 124 (and optional magnifier mirror on opposite side) secured to the retainer 70 is used to examine hidden or obstructed objects. This function will hereinafter be described in detail.

The manner in which a user positions the illumination device 10 to see objects that are obscured from the direct view is illustrated orthogonally in FIG. 6. In this example the mirror 124, secured to the retainer 70, of the combined retainer and male ball member 56 is employed. In this illustration, a viewer's eye 72 needs to view a target object 74, but an intervening object 76 makes it impossible for the viewer's eye 72, to see the target object 74. To see the target object 74, first, if needed, a user unwinds the positioning member 14 to obtain a desired length. Then from the closed position (shown in FIG. 3) the member 56 is opened 180 degrees. Then the user turns the member 56 45 degrees as clearly illustrated in FIG. 6. Then the user positions the holding and storage means 12 so the light source 20 is directed toward the target object 74. This is represented by an arrow and a letter A. An arrow and a letter B represent the first reflection of the target object 74. The user then directs his or her line of sight, represented by an arrow and a letter C, parallel to the holding and storage means 12 and 45 degrees relative to the member 56. The user can now view the target object 74. The angles previously described do not need to be precise, many other angles and positions can be used to view the target object 74. In addition, because the ball and socket assembly 16 can detach fully from the illumination device 10 and used independently or clamp to the positioning member 14 as shown in FIG. 7, a plurality of positions and options are available for viewing obstructed objects.

As illustrated in FIGS. 1 and 4 the inside the cavity 78 that extends inward from a front surface 80 of the holding and storage means 12. There is a retaining ridge 82 located on an interior wall 84 of the cavity 78 of the holding and storage means 12. As illustrated in FIGS. 1 and 2 a front cover 86 is located within the cavity 78 and secured by an outwardly biasing force from securing tabs 88 located on an outer peripheral edge 90 of the front cover 86. The front cover 86 has a centrally located circular hole 92. The outer peripheral edge 90 along with the securing tabs 88 of the front cover 86 is sized and shaped for manual positioning over the retaining ridge 82. The securing tabs 88 deform slightly to secure the front cover 86 by means of a pressure fit within the cavity 78.

As illustrated in FIGS. 1, and 2 the centrally located circular hole 92 in the front cover 86 is sized and shaped to receive a generally hemispherical shaped light-emitting portion 94 of a light emitting diode (LED) 96.

It should be noted that the front cover 86 can be manufactured from transparent material, and manufactured without the hole 92, and then mounted by removing a rear cover 108, and inserting the front cover 86 until it is secured by the retaining ridge 82. This is important if the manufacturer desires more protection of the light source 20, better waterproofing performance, and or an alternate assembly process. In addition, if the rear cover 108 is made of transparent material and side emitting LEDs are attached to the interior wall 84 of the cavity 78, light will emit from both ends of the holding and storage means 12. When the holding and storage means 12 projects light from both ends and is manufactured to hold the ball and socket assembly 16 on either side, then two ball and socket assemblies 16 can be utilized to provide additional uses for the portable multi-purpose illumination device 10.

As illustrated in FIGS. 1 and 4, a negative LED electrical contact 98 and a positive LED electrical contact 100 of the LED 96 are connected to a negative LED conductor 102 and a positive LED conductor 104, and then connected to the connector 24 as shown in FIG. 4. In this manner, electrical power supplied to the electrical conductors 38 and 40 (in the positioning member 14) passes through the connector 24, through the conductors 102 and 104, then through the electrical contacts 98 and 100 of the LED 96 to cause the LED 96 to emit light.

FIGS. 4 and 8 illustrate the portable multi-purpose illumination device 10 detached from the power supply 18. If the electrical connector 30 is replaced by someone skilled in the art with a conventional connector such as a USB, BNC, XLR or the like, a user can then attach the illumination device 10 to a variety of alternate power sources other than the power supply 18. It should be noted there are numerous examples of electrical conduits that do not connect to all of the available connections of a plug (do not utilize all the optional connections of said plug). A simple 2-line 4-connector telephone plug is one such example. Two wires are used for single line and four wires are used for two lines. In a similar fashion, the negative electrical conductor 38 and the positive electrical conductor 40 can be connected to a 4-wire connector such as a USB connector by someone skilled in the art. It should also be noted that the positioning member 14 could also be built with a plurality of electrical conductors. Thus, the portable multi-purpose illumination device 10 can be wired for other useful applications. For example, when the electrical connector 30 is replaced with a conventional USB connector, a user can attach the illumination device 10 to a computer with compatible USB connector. Note, many professional lighting and mixing boards have electrical BNC connectors specifically designed to accept lighting fixtures for lighting the mixing board. When the electrical connector 30 is replaced with a conventional BNC connector a user can then attach the illumination device 10 to a conventional audio or lighting mixing board.

The portable multi-purpose illumination device 10 can be hard wired without the electrical connector 30 by using the negative electrical conductor 38 and positive electrical conductor 40 located on the end of the positioning member 14. The illumination device 10 is ideal for cabinet lighting (such as kitchen cabinets) because of the low profile of the holding and storage means 12. The positioning member 14 attached to a mast or a pole then attached to a suitable base with means for supplying power enables the illumination device 10 to function as a conventional desk light. A larger scaled version of the illumination device 10 with the ball and socket assembly 16 attached to a power supplying pole can be used to safely examine the underside of a vehicles for security purposes.

FIG. 8 illustrates the portable multi-purpose illumination device 10 with a switch 106 (pushbutton type) located on the rear cover 108 of the holding and storage means 12. The switch 106 is useful when another power source other then the power supply 18 is used. For this embodiment the power supply switch 42 located on the power supply 18 is not needed.

Figure 9:
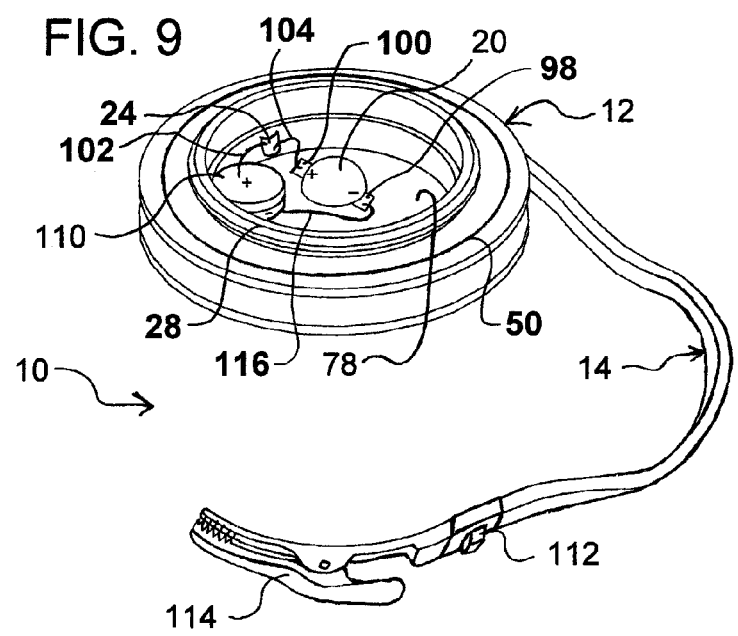
FIG. 9 is a perspective view of the portable multi-purpose illumination device illustrating a battery housed within a holding and storage means and showing a small clip on the end of a positioning member. A conventional battery holding means has been removed for clarity.

FIG. 9 illustrates the portable multi-purpose illumination device 10 equipped with an alternate location for its power supply. The front cover 86 has been removed from FIG. 9 for clarity. In this embodiment, the power supply is a detachable battery 110 such as a coin cell or cells that are secured substantially inside the cavity 78 of the holding and storage means 12 by conventional means. A negative small battery conductor 116 connects the negative contact of the detachable battery 110 to the negative LED electrical contact 98. The positive LED conductor 104 connects to the positive LED electrical contact 100. The negative LED conductor 102 (now functions as a positive conductor) connects to the positive contact of the detachable battery 110. The electrical conductors 40 and 38 now function together as a positive conductor attached to a PM switch 112 located on the end of the positioning member 14 to regulate the light source 20 in a conventional manor. A clip 114 similar to an alligator style clip is secured to the end of the positioning member 14 enabling the user to attach the illumination device 10 to an object. The switch 106 as shown in FIG. 8 can also be used in place of the PM switch 112 as shown in FIG. 9.

Example

A portable multi-purpose illumination device 10 was manufactured using conventional materials and components known in the art and using conventional molding, and manufacturing techniques. In this connection, the holding and storage means 12 is custom machined from aluminum stock by Crow Corporation, 23715 F. M. 2978, Tomball, Tex. 77375. The positioning member 14 is made from 18-gauge solid core wire with 2 conductors, known in the art as 18/2 cable, and is approximately one foot long. The two solid core 18 gauge copper wires provide the positioning member 14 with temporarily manually deformability, support means, and convey electrical power. All other wires and various connectors are conventional. The front cover 86 is precession laser cut from thin 0.024-inch white PVC stock and manufactured by Gleicher Manufacturing Corporation, 851 Jerusalem Road, Scotch Plains, N.J. 07076. The power supply 18 and the ball and socket assembly 16 are manufactured using conventional injection molding techniques and the like. The LED 96 is available from Philips Lumileds Lighting Company or Seoul Semiconductor or Cree, Inc. By using the previous descriptions and figures, anyone skilled in the art, can assemble the illumination device 10 in a straight forward, very easy, and obvious way.

Operation

The portable multi-purpose illumination device 10 may be operated in the three most popular modes as follows.

As a conventional handheld flashlight, simply turn the power supply switch 42 on. In this example, the LED 96 projects a narrow beam. If the light source 20 or the LED 96 projects a lambertian pattern, the ball and socket assembly 16 is typically used with member 56 in a closed position as shown in FIG. 3 and the lens 122 of a collimator type or the like secured by the retainer 70 is used to project the light source 20 in a beam-like manor.

The second popular use of the illumination device 10 is as a task light. This is best illustrated in FIGS. 3 and 5. In this mode, a user, if desired, removes the ball and socket assembly 16 from the holding and storage means 12, and then unwinds the positioning member 14 from the holding and storage means 12 to obtain a desired length. Finally, the user bends the positioning member 14 to obtain the desired placement of the light source 20.

The third popular mode is viewing an obstructed object. Here a user opens the combined retainer and male ball member 56 with the mirror 124 secured by the retainer 70 and then positions the illumination device 10 in a location to see the obstructed object.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A portable multi-purpose illumination device that wraps into a compact shape for storage, comprising:
   a light source housed within a housing and powered by connection a power source,
   wherein said housing has a circumferential storage channel; and
   a positioning member attached to one end of said circumferential storage channel and an other end of said power source and having sufficient rigidity to hold said housing in an elevated position, from said power source, wherein said positioning member is configured to wind upon itself in a substantially planar curve as it winds around said circumferential storage channel to vary the extension thereof and for storage.

2. The portable multi-purpose illumination device according to claim 1, wherein the positioning member has electrical conduction means and is electrically connected to the light source.

3. The portable multi-purpose illumination device according to claim 1, wherein the power source includes a power source switch for controlling the light source.

4. The portable multi-purpose illumination device according to claim 1, wherein the power source is comprised of a detachable battery.

5. The portable multi-purpose illumination device according to claim 1, wherein the housing includes a switch connected between the light source and the power source for controlling the light source.

6. The portable multi-purpose illumination device according to claim 1, further comprising a holding clamp attached to the exterior of the power source for securing the housing to the power source; and securing means for securing the power source to an external structure or surface.

7. The portable multi-purpose illumination device according to claim 1, further comprising pivot means provided on the power source to join the positioning member to the power source so that the positioning member pivotally extends from the power source.

8. The portable multi-purpose illumination device according to claim 1, wherein the housing is provided with rotational means to which one end of the positioning member is attached and around which the positioning member rotates to vary the extension thereof and for storage.

9. The portable multi-purpose illumination device according to claim 1, wherein the positioning member is manually deformable to provide at least one of articulation and a holding configuration to an external structure or surface.

10. The portable multi-purpose illumination device according to claim 1, wherein the positioning member is detachable from at least the power source and is provided with one of (a) a clip for reattachment to an external structure or surface and (b) an electrical connector suitable for connecting to alternate power sources.

11. The portable multi-purpose illumination device according to claim 1, further comprising mounting means for mounting the light source within the housing; a rear cover covering one side of the housing; and at least one rotating ring which is detachably mounted on an outer cylinder wall of the housing through which light emitted from the light source exits the housing.

12. The portable multi-purpose illumination device according to claim 1, further comprising a connecting arm extending from the rotating ring and terminating in a female socket joint of a ball and socket assembly for detachable mounting of a detachable mounting means thereto.

13. The portable multi-purpose illumination device according to claim 12, wherein the detachable mounting means is a retainer for one of a mirror, a lens, a diffuser, or a color filter, and wherein the retainer includes a male ball member of the ball and socket assembly for detachable connection of the male ball member to the female socket joint.

14. The portable multi-purpose illumination device according to claim 13, wherein the male ball member and the female socket joint articulate as the ball and socket assembly when engaged.

15. The portable multi-purpose illumination device according to claim 14, wherein the retainer retains a mirror.

16. The portable multi-purpose illumination device according to claim 1, wherein the light source is at least one light emitting diode.

17. A method of viewing a target object obscured from direct view of a user by an intervening object, the method comprising:
   a. providing the portable multi-purpose illumination device according to claim 15; and
   b. positioning the mirror of the portable multi-purpose illumination device so that the user can view the target object despite the presence of the intervening object.

18. The portable multi-purpose illumination device according to claim 1, wherein the power source is a power supply electrically connected via the positioning member.

* * * * *